United States Patent Office 3,112,647
Patented Dec. 3, 1963

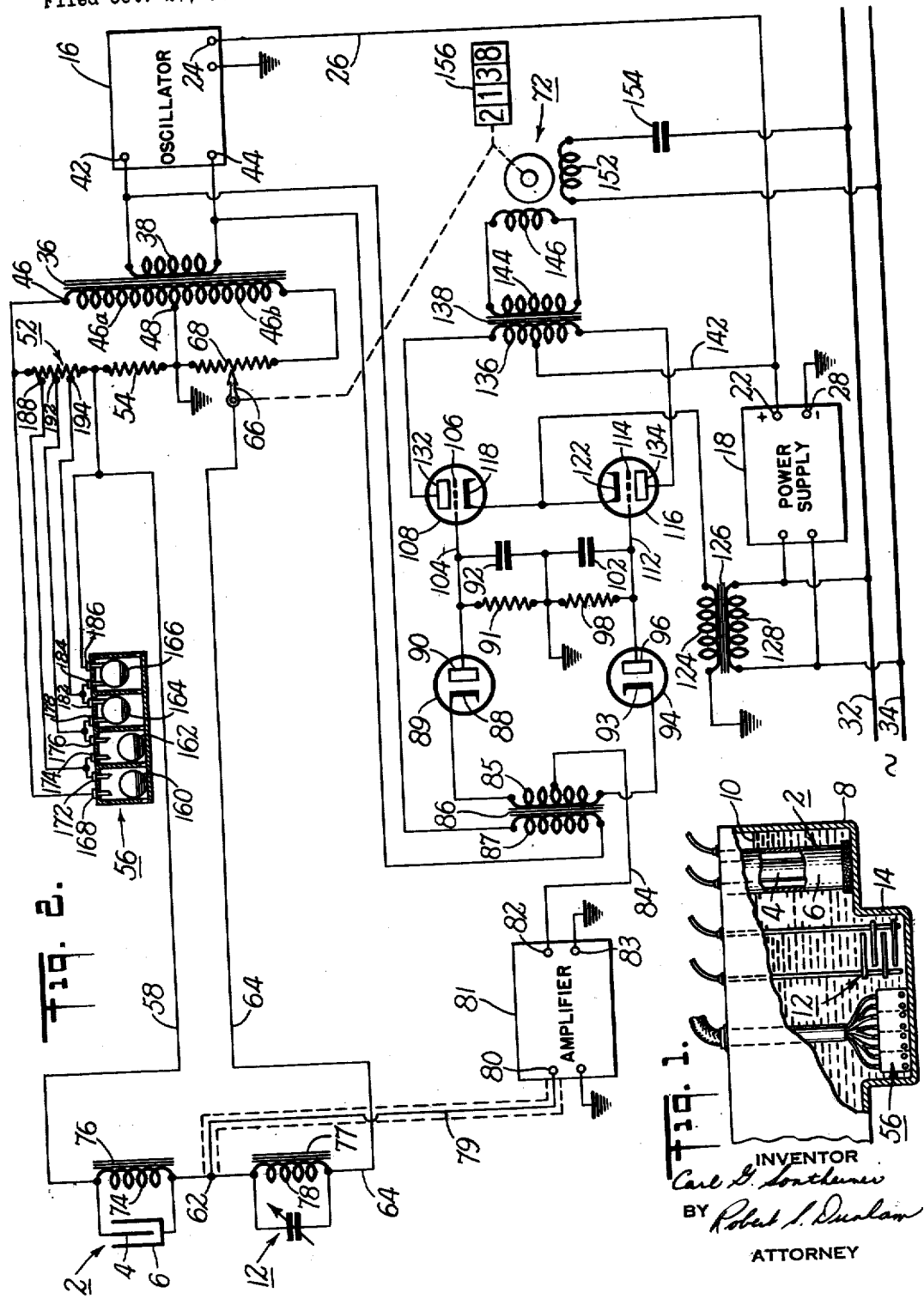

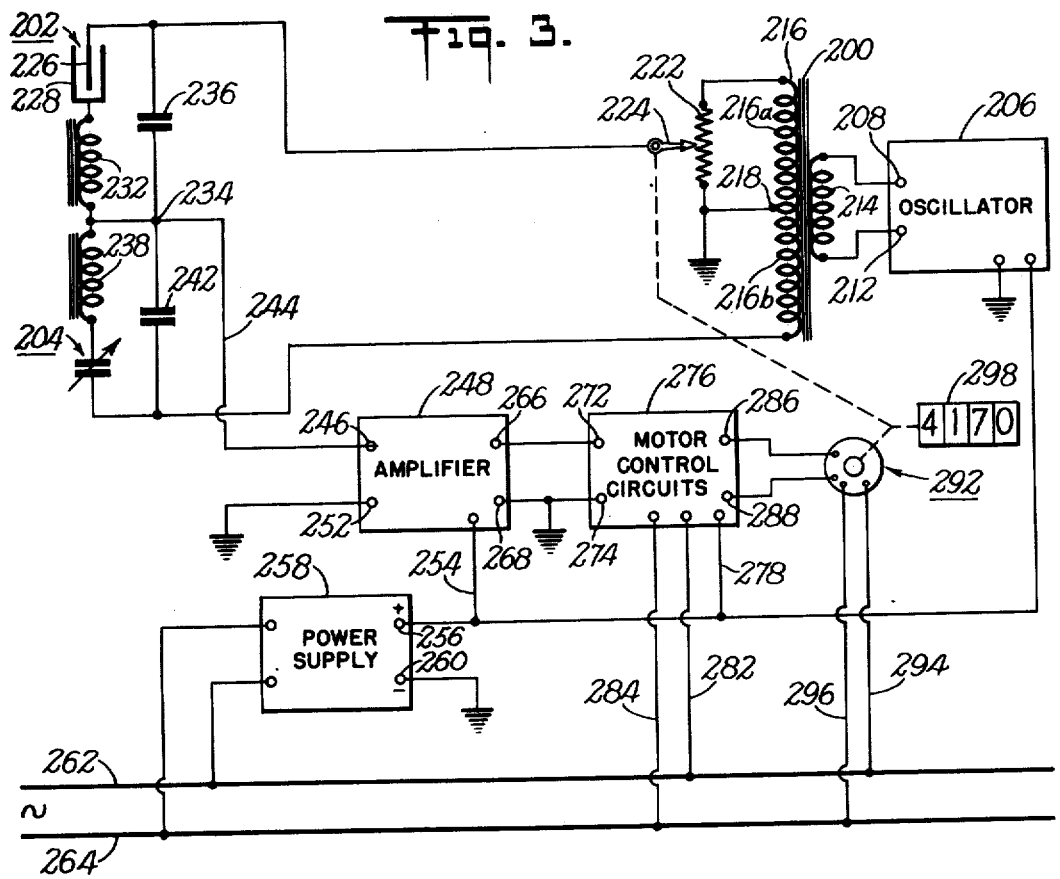

3,112,647
MEASURING SYSTEM WITH COMPENSATION
FOR DIELECTRIC CONSTANT
Carl G. Sontheimer, Riverside, Conn., assignor to The
Liquidometer Corporation, Long Island City, N.Y., a
corporation of Delaware
Filed Oct. 27, 1954, Ser. No. 465,038
16 Claims. (Cl. 73—304)

This invention relates to measuring systems wherein the determinations are made by capacitance measurements, and particularly to systems for measuring the amount of liquid in a container.

Such systems depend on the fact that the capacity of a condenser is a direct function of the dielectric constant of the material between its plates. A measuring condenser is formed of two or more spaced plates positioned vertically in the tank of liquid, the space between the plates communicating with the liquid to allow the level of the liquid between the plates to rise or fall as the liquid level in the tank varies, thereby causing a corresponding change in the capacity of the measuring condenser, so that the level of liquid in the tank can be determined by measuring the capacity of the condenser. For example, assume that if the tank is empty so that the dielectric material between the plates is air, which has a dielectric constant of unity, the plates have an effective area and are spaced so that they have a capacity of 100 micromicrofarads, and that the particular liquid, the level of which is to be measured, has a dielectric constant of two. As the liquid level rises in the tank, the air between the condenser plates will be displaced gradually by the liquid, so that the capacity of the condenser will increase correspondingly until, when the liquid has completely replaced the air, the condenser will have a capacitance of 200 micromicrofarads. The capacity of the measuring condenser is thus a measure of the level of the liquid in the tank.

It is apparent, however, that capacitance measuring systems must be calibrated for a liquid having a particular dielectric constant, and if the dielectric constant changes, a new calibration must be made or false readings will be obtained. Thus, although capacitance type gauges have certain inherent advantages for many applications, for example, for measuring the quantity of gasoline in airplane tanks, the indications obtained are not reliable because the composition of the gasoline is not always the same and the dielectric constant is different for the different compositions.

One aspect of the present invention is directed to compensation for changes in dielectric constant to provide a capacitance-type liquid measuring gauge, the indications of which are independent of the dielectric constant of the liquid.

This compensation provides a measuring system in which the indicator can be calibrated to read in terms of true volume; but for many applications it is important to know the weight of the liquid in the tank. For example, the volume of gasoline in the tanks of an airplane will vary with changes in temperature, but the energy available from the fuel remains constant, that is, the energy is proportional to the weight of the gasoline and not to its volume. It is thus apparent that for airplane fuel gauge systems, and for other applications, it is important that the indicator denote the actual weight of the fuel, independent of its density.

A second aspect of this invention is directed to compensation for variations in density to provide a capacitance-type liquid measuring system that can be calibrated accurately in terms of total weight of the liquid.

A preferred embodiment of the invention utilizes a bridge circuit with two condensers, one of which is arranged so that its capacitance is a predetermined function of the liquid level and the other is a compensating condenser that is completely immersed in the liquid at all times. Two inductances are connected, respectively, to the two condensers and have values selected, as will be described later, to eliminate errors caused by variations in the dielectric constant of the liquid. This embodiment also includes a device responsive to variations in density of the liquid, so that the indicator can be calibrated to read the weight of the liquid.

The present application is related to a patent granted upon a copending application of Edelman, now reissue patent No. Re. 23,493, reissued May 20, 1952, for "Liquid Level Gauge," which is owned in common with the present application. These two applications have priority in the order of their respective filing dates; in other words, the Edelman reissue patent aforesaid carries all claims generic to the two disclosures; while the claims of the present application are limited to subject matter readable upon the present disclosure and not readable upon the disclosure of the Edelman reissue patent aforesaid.

These and other aspects, objects, and advantages of the invention will become apparent from the following examples of features of construction, combinations of elements, arrangements of parts, and sequences and series of steps, considered together with the accompanying drawings in which:

FIGURE 1 is a diagrammatic view showing a portion of a fuel tank with a measuring condenser and other apparatus positioned therein;

FIGURE 2 is a circuit diagram of a measuring system embodying the invention; and FIGURE 3 shows another embodiment of the invention utilizing a different arrangement of the bridge elements.

As shown in FIGURE 1, a measuring condenser, generally indicated at 2, having plates formed by an inner metal cylinder 4 and an outer metal cylinder 6 which surrounds and is spaced from the inner cylinder 4, is positioned vertically in a liquid-containing tank 8, which is assumed to be of uniform cross-sectional area. The cylinders 4 and 6 have uniform cross-sectional dimensions and are supported mechanically in any suitable way and, in this particular embodiment, are insulated from ground. Suitable openings (not shown) are provided in the outer cylinder 6 so that the liquid 10, the quantity of which is to be measured, will rise to a level between the two cylinders corresponding to the level of the liquid in the tank. The electrical capacity of the measuring condenser 2 is then a function of the level of liquid in the tank and the dielectric constant of the liquid.

A compensating condenser, generally indicated at 12, is also positioned in the tank 8 and is formed, for example, by two sets of flat plates which are spaced from each other and provided with suitable insulating supports (not shown). The condenser 12 is positioned in a recess 14 in the bottom of the tank 8, so that the plates of this condenser are at all times immersed in the liquid in the tank.

The arrangement of these condensers in a bridge-type measuring system is shown in FIGURE 2. This bridge circuit is energized by an oscillator, indicated in block form at 16, which may be of conventional type, but which should be stable in operation so that the frequency of its signal will remain constant. The signal produced by the oscillator 16 is preferably in the audio-frequency range, but may be higher if desired; a frequency of 10,000 cycles per second is suitable. The oscillator 16 may be energized from a conventional rectifier-filter power supply, indicated in block form at 18, the positive terminal 22 of which is connected to terminal 24 of the oscillator 16 by a lead 26, the supply circuit being completed from the negative terminal 28 of power supply 18 through the common ground circuit. The power supply 18 is in turn connected to power mains 32 and 34, supplying, for example, 400-cycle alternating current.

The signal from the oscillator 16 is coupled to the bridge circuit through a transformer 36, the primary winding 38 of which is connected across the output terminals 42 and 44 of the oscillator 16. The secondary winding 46 is divided into two equal portions 46a and 46b by a center-tap 48 which is connected to the common ground circuit.

A tapped resistor, generally indicated at 52, and a fixed resistor 54 are connected in series across the secondary winding portion 46a. The taped resistor 52 is connected to a density responsive device, indicated diagrammatically at 56, which controls the effective resistance of resistor 52 to compensate automatically for changes in density. The opertaion of this device will be described more fully later.

The junction of resistors 52 and 54 is connected by a lead 58 to the inner plate 4 of the measuring condenser 2, the outer plate 6 of which is connected to a bridge output terminal 62.

The bridge output terminal 62 is connected also to one set of plates of the submerged compensating condenser 12, the other set of plates of which is connected by a lead 64 to a sliding contact 66 of a potentiometer 68 which is connected across the portion 46b of the secondary winding of the transformer 46. This potentiometer is for the purpose of rebalancing the bridge circuit and can be operated manually; or the system can be rebalanced automatically by means of a motor, generally indicated at 72, which is mechanically connected to control the setting of the sliding contact 66.

An inductance 74, having a powdered iron core 76, is connected in parallel with the measuring condenser 2; and an inductance 78, having a powdered iron core 77, is connected in parallel with the compensating condenser 12. These inductances and the compensating condenser 12 are provided for the purpose of compensating for changes in the dieclctric constant of the liquid 10, the volume or weight of which is to be measured. The inductance 74 has a reactance, at the frequency of operation, equal and opposite to that of the condenser 2 when the tank 8 is empty and the space between its plates is filled with air. The inductance 78 has a reactance, at the frequency of operation, equal and opposite to that which the compensating condenser 12 would have if it were removed from the liquid 10 so that the spaces between its plates were filled with air. These inductances, in effect, cancel the residual capacities of the condensers and permit the bridge balance condition to become independent of the dielectric constant of the liquid. The manner in which this is accomplished will be more apparent from a mathematical explanation of the bridge balance condition, which will be considered later. The reactances of the condensers 2 and 12, for the purpose of computing the values for the inductances 74 and 78, can be considered to include any fixed stray capacitances, for example, lead capacitance, and the inductances will then compensate also for errors which otherwise would be introduced by these stray capacities. The inductances 74 and 78 should be stable under the conditions of operation, and should have a high Q at the frequency of operation.

If the impedance of the parallel combination of the measuring condenser 2 and the inductance 74 is equal to the impedance of the parallel combination of the compensating condenser 12 and the inductance 78; and if the voltages delivered to this potrion of the bridge circuit by the leads 58 and 64 are balanced with respect to ground, no unbalance voltage will appear between output terminal 62 and ground. If the impedance of one of these condenser-inductance combinations is greater than the other, an unbalance voltage is developed which is either in-phase, or 180° out-of-phase, with respect to the voltage delivered by the oscillator 16, depending upon which of the two birdge arms has the higher impedance. The bridge circuit can be rebalanced by varying the voltage applied to the bridge circuit by one of the portions 46a or 46b of transformer winding 46. This is accomplished, as pointed out above, by adjustment of the sliding contact 66 of the potentiometer 68, the position of the contact 66, when the bridge is balanced, corresponding to the relative impedances of the two bridge arms including the measuring and compensating condensers 2 and 12.

The impedance of the transformer winding 46, and the resistance of resistors 52 and 54 and potentiometer 68 are preferably so low as compared with the impedances of the measuring and compensating condensers 2 and 12, that they can be neglected in calculating the circuit parameters.

This bridge circuit is rebalanced automatically by the following circuit arrangement. The unbalance voltage appearing at the bridge output terminal 62 is coupled by means of a shielded lead 79 to an input terminal 80 of a conventional vacuum tube amplifier, shown in block form at 81.

The amplified voltage appears between two output terminals 82 and 83 of the amplifier 81, the terminal 83 being connected to ground and the terminal 82, by a lead 84, to the center tap of a secondary winding 85 of a transformer 86.

The primary winding 87 of this transformer is connected across the output terminals 42 and 44 of the oscillator 16. The signal induced in the secondary winding 85 of the transformer 86 from the primary winding 87, and the unbalance signal delivered to it from the amplifier 81 will add in one-half of the secondary winding 85, but will oppose each other in the opposite half of this winding. Thus, when the bridge is unbalanced, the voltage at one end of transformer winding 85, with respect to ground, will be relatively high and the voltage at the opposite end of the winding, with respect to ground, will be relatively lower. The end of the winding 85 having the higher voltage will depend upon the phase relationship of the two voltages. When the bridge is balanced, no voltage will be delivered by the amplifier 81 to the transformer winding 85 and, accordingly, the voltages between each end of the transformer winding 85 and ground will be equal.

The voltages delivered by winding 85 are coupled to conventional rectifier-filter arrangements. One end of the transformer winding 85 is connected to a cathode 88 of a diode rectifier tube 89, the anode 90 of which is connected to ground through a load resistor 91, a suitable filter condenser 92 being connected in parallel with the load resistor 91.

The opposite end of transformer winding 85 is connected to a cathode 93 of a diode rectifier tube 94, the anode 96 of which is connected to ground through a load resistor 98, which is identical in value with the load resistor 91 of tube 89. A filter condenser 102 is connected in parallel with the load resistor 98.

A negative D.-C. voltage is produced at each of the anodes 90 and 96 in accordance with the magnitude of the alternating voltages delivered to their respective cathodes from the transformer winding 85. The direct voltage appearing at anode 90 of tube 89 is coupled by a lead 104 to a control grid 106 of a vacuum tube 108, which is shown as a triode by way of example, but which may be a tetrode or pentode connected in conventional manner. The direct voltage appearing at anode 96 of tube 94 is connected by a lead 112 to a control grid 114 of a vacuum tube 116, which is identical with tube 108.

The cathodes 118 and 122 of tubes 108 and 116, respectively, are connected together and to ground through a secondary winding 124 of a transformer 126, the primary 128 of which is connected to the 400-cycle alternating current mains 32 and 34.

The anodes 132 and 134 of the tubes 108 and 116, respectively, are connected to opposite ends of a primary winding 136 of an output transformer 138, the midpoint of which is connected by a lead 142 to the positive terminal 22 of the power supply 18.

If the negative control voltages applied to the grids 106 and 114 of tubes 108 and 116 are equal, so that the conductivities of the two tubes are equal, the 400-cycle signal, which is induced in the cathode circuits by transformer 126, will be canceled in the anode circuits, and no voltage will be induced in the secondary winding 144 of the transformer 138. However, if the bridge is unbalanced, for example, in such a direction that a higher negative voltage is delivered by diode 94 than by diode 89, tube 108 will have a higher conductivity and the 400-cycle signal will not be canceled in the anode circuits of the tubes 108 and 116, and an alternating voltage will be induced in the secondary transformer winding 144. If the bridge is unbalanced in the opposite direction so that tube 116 has the greater conductivity, the 400-cycle signal appearing in the secondary winding 144, will be of opposite phase. Thus, with the bridge circuit balanced, no voltage will appear in the secondary winding 144 of transformer 138; if the bridge is unbalanced in one direction a 400-cycle signal is produced of one phase, and if it is unbalanced in the opposite direction a 400-cycle signal of opposite phase is induced in this winding.

The transformer winding 144 is connected to a winding 146 of the two-phase reversible motor 72. The other winding 152 of this motor is connected through a phase shifting condenser 154 to the 400-cycle mains 32 and 34. If no voltage is applied to the winding 146 to the motor 72, the motor remains stationary; if the voltage applied to this winding is in phase with the voltage delivered by the alternating current mains, the motor will rotate in one direction, and if the voltage applied to this winding is of opposite phase, the motor will rotate in the opposite direction. The direction of rotation of the motor 72, thus, depends upon the direction of unbalance of the bridge circuit.

This motor 72 is mechanically connected through a suitable coupling and gear reduction arrangement (not shown in detail, but indicated by a broken line) to the sliding contact 66 of the potentiometer 68 and the phase relationships in the circuit are adjusted, in known manner, so that the motor 72 will rotate in such direction as to rebalance the bridge.

The motor 72 is mechanically connected also to a counter-type indicator 156 which denotes the amount of liquid in the tank 8.

In order to compensate for changes in the density of the liquid 10, so that the indicator 156 can be calibrated in terms of weight of the liquid, the voltage applied to the bridge circuit by the portion 46a of transformer winding 46 is varied as a function of the density of the liquid 10. The density is measured by the density-responsive device 56, which may comprise, for example, four metal floats 160, 162, 164, and 166, all having the same volume but differing slightly in weight so that their bulk densities extend over the range corresponding to the variation in density expected in the liquid or liquids being measured. This density-responsive device 56 is indicated also in FIGURE 1, where it is shown in the recess 14, so that it is always completely submerged in the liquid 10. The floats are free to move vertically within separate compartments, so that a particular float will rise if its bulk density is less than that of the liquid, or will sink if it is greater. For example, if the liquid being measured has the maximum density for which the floats have been adjusted, all of the floats will rise to the top of their respective compartments, if the density of the liquid is the minimum expected to be encountered, the weight of the floats are such that they will not be supported by the liquid and will sink to the bottom of their respective compartments. If the density is intermediate these two limits, one or more of the floats will rise depending upon the density of the particular liquid. Electrical contacts, as at 168, 172, 174, 176, 178, 182, 184, and 186, are provided at the top of the compartments, so that if the density of the liquid 10 is such that a particular metal float rises to the top of its compartment, it completes an electrical circuit between the two electrical contacts which it engages. These contacts are connected to the ends of resistor 52 and to its taps 188, 192, and 194, so that as each float rises it shorts out a portion of the resistor 52, thus increasing the voltage applied to the measuring condenser 2. The contact 168 is connected to the junction of transformer winding 46a and resistor 52; contacts 172 and 174 are connected to the tap 188; contacts 176 and 178 are connected to the tap 192; contacts 182 and 184 are connected to the tap 194; and the contact 186 is connected to the end of resistor 52 at its junction with resistor 54.

When all of the floats 160, 162, 164, and 166 are at the bottom of their respective compartments, so that all the contacts are open, the full resistance of resistor 52 is in the circuit and minimum voltage is applied to the bridge circuit from the transformer winding 46a. If the density of the liquid being measured is increased slightly, float 166 rises in its compartment and closes the circuit between contacts 184 and 186, shorting out that portion of the resistor 52 between the tap 194 and the end of the resistor, thus increasing the voltage applied to the bridge circuit by an amount just sufficient to compensate for the change in density of the liquid 10. With a further increase in density, float 164 also rises in its compartment and closes the circuit between contact points 178 and 182, shorting out the next portion of the resistor 52 and further increasing the voltage applied to the bridge circuit to compensate further for the change in density.

The contact points can, of course, be hermetically sealed and operated by magnetic means in order to avoid the presence of the liquid adjacent to the contacts and to insure good electrical connections. Any number of floats can be employed depending upon the accuracy desired. The density responsive device 56, for example, can be of the type described more fully in the copending application, Serial No. 127,076, filed November 14, 1949, now U.S. Patent No. 2,691,296 granted October 12, 1954 and which was reissued as Reissue Patent No. 24,075 granted October 18, 1955 upon an application for reissue filed April 15, 1955; or any other suitable device responsive to the density of the liquid and arranged to vary the voltage applied to the bridge measuring circuit can be employed.

In order to explain the operation of the system, the measuring condenser 2 may be considered to have a capacity of $C_o$ when the tank is empty and the space between the inner and outer cylinders is filled with air. As in the above example, the horizontal cross-sectional area of the liquid-containing tank is assumed to be constant and the measuring condenser of uniform horizontal dimensions throughout its length. Assume also that the dielectric constant of the liquid 10 is K, the height of the tank is H, and the depth of the liquid in the tank is L, then the proportion (X) of the measuring condenser 2 that is immersed in the liquid is $$X = \frac{L}{H} \tag{1}$$

and the capacity ($C_m$) of the measuring condenser is $$C_m = C_o + XKC_o - XC_o \tag{2}$$

or $$C_m = C_o[1 + X(K-1)] \tag{3}$$

Assume that the oscillator 16 delivers a signal of frequency $$\frac{\omega}{2\pi}$$

The inductance 74, in parallel with the measure condenser 2, is of such value that the combination is resonant at this frequency when the tank is empty; the value of the inductance then is $$L_{74} = \frac{1}{\omega^2 C_o} \quad (4)$$

The impedance of this parallel combination is $$Z_1 = \frac{1}{j\omega C_o (K-1) X} \quad (5)$$

The comparison condenser 12 is assumed to have a value of $C_{co}$ when the dielectric material between its plates is air, and this value may be expressed as $\delta C_o$. When submerged in the liquid 10 in the tank 8, this condenser will have the value $$C_c = K \delta C_o \quad (6)$$

This condenser is connected in parallel with the inductance 78, which is of such value as to be resonant with a capacitance of value $C_{co}$ at the frequency $$\frac{\omega}{2\pi}$$

which is the frequency of the signal generated by the oscillator 16; this inductance has the value $$L_{78} = \frac{1}{\omega^2 \delta C_o} \quad (7)$$

and the impedance of the parallel combination is $$Z_2 = \frac{1}{j\omega \delta C_o (K-1)} \quad (8)$$

In the circuit arrangement shown in FIGURE 2, assume that the oscillator 16 induces a voltage of "2e" in the secondary winding 46 of the transformer 36, and that all of the floats 160, 162, 164, and 166 are in their upper positions so that the resistor 52 is short-circuited and the full voltage "e" of winding portion 46a is applied to the bridge circuit. The voltage applied to the circuit from the other half 46b of the transformer winding 46 is a function of the position of the sliding contact 66 of the potentiometer 68; let this voltage, between the sliding contact 66 and ground, be denoted as "$-me$," where the factor "$m$" depends upon the setting of the potentiometer contact 66.

If the unbalance voltage of the bridge circuit, appearing between point 62 and ground, is denoted by "$e_o$," then (neglecting the source impedance of the transformer and assuming a high input impedance in the amplifier 81)

$$\frac{e_0}{e} = \frac{Z_2}{Z_1 + Z_2} - \frac{m Z_1}{Z_1 + Z_2} \quad (9)$$

and substituting the values of $Z_1$ and $Z_2$ from Equations 5 and 8;

$$\frac{e_0}{e} = \frac{X - m\delta}{X + \delta} \quad (10)$$

Thus, if $X = m\delta$, there is no unbalance voltage and the setting of the potentiometer contact 66 is an indication of the level of the liquid 10 and is independent of the dielectric constant of the liquid. If "X" is greater than $m\delta$, the unbalance voltage is in phase with the voltage "e" between the upper end of transformer winding 46a and ground; if "X" is smaller than $m\delta$, the unbalance voltage is of opposite phase.

It is apparent that the motor 72 can be connected so that if "X" is greater than $m\delta$, the sliding contact 66 of the potentiometer 68 will be moved in such direction as to decrease "$m$" and reduce the unbalance voltage to zero, at which time the motor will stop.

The compensation for variations in the density of the liquid 10 is accomplished by adjusting the weights of the floats 160, 162, 164, and 166, and the positions of the taps on the resistor 52 so that the ratio of the voltage at the junction of the resistors 52 and 54 to the voltage "e" across winding 46a is proportional to the density of the liquid 10. Let this ratio be represented by "$g$," then $$g = \frac{R_{54}}{R_{52} + R_{54}} \quad (11)$$

where $R_{52}$ is the resistance value of resistor 52 actually in the circuit, and $R_{54}$ is the resistance value of resistor 54. The balance condition then becomes $$gX = m\delta \quad (12)$$

As pointed out above, "X" is proportional to the volume of liquid 10 in the tank 8, and the product "gX" is, therefore, proportional to the total weight of the liquid 10 in the tank and "$m$," the setting of the potentiometer contact 66, is a function of the actual weight of the liquid 10 and is independent of its density and dielectric constant.

If the total amount of liquid in several tanks is to be measured, additional measuring condensers can be connected in parallel with the condenser 2, an appropriate adjustment being made in the value of the inductance 74. If the dielectric constants of the materials in the different tanks are not identical, a compensating condenser corresponding to the condenser 12, and connected in parallel therewith, can be placed in each tank, otherwise only a single compensating condenser may be required.

If the cross-section of the tank holding the liquid is not uniform, linear calibration characteristics can be obtained by appropriately tapering the potentiometer 68, so that the non-linearity of the resistance change per unit of movement of the sliding contact 66 just compensates for the non-linear change in fuel quantity per unit depth. Alternatively, the plates of the measuring condenser 2 can be shaped so that the change in capacity with the rising or falling of the liquid corresponds at each level to the change in quantity of liquid in the tank.

In the arrangement shown in FIGURE 3, the bridge circuit includes a transformer 200, which corresponds to the transformer 36 of FIGURE 2, a measuring condenser generally indicated at 202 which, for example, may be similar to the measuring condenser 2 of FIGURE 1, and a compensating condenser generally indicated at 204, which corresponds to the compensating condenser 12 of FIGURE 1, and which is arranged to be at all times submerged in the liquid 10 which is to be measured. These elements are arranged in a bridge circuit which is energized by means of an oscillator, shown in block form at 206, and which is identical with the oscillator 16 of FIGURE 2. The output terminals 208 and 212 of the oscillator 206 are connected to the primary winding 214 of the transformer 200, the secondary winding 216 of which forms part of the measuring bridge circuit.

The winding 216 is provided with a tap 218 at its midpoint which is connected to ground and forms one of the output terminals of the bridge circuit; this connection divides the secondary winding into two equal low-impedance portions 216a and 216b. The winding portion 216a is shunted by a rebalancing potentiometer 222 having a sliding contact 224. The secondary transformer winding 216 and the potentiometer 222 are so designed that their impedances are small compared with the impedances of the measuring and compensating condensers 202 and 204.

The sliding contact 224 of the potentiometer 222 is connected to the inner plate 226 of the measuring condenser 202, the outer plate 228 of which is connected through an inductance 232 which, for example, may be a toroidal winding on a ferromagnetic alloy dust core, to a bridge output terminal 234. A fixed condenser 236 is connected in parallel with the series combination of inductance 232 and condenser 202.

The ungrounded end of transformer winding 216b is connected to one set of plates of the compensating condenser 204, the other set of plates of which is connected through an inductance 238 to the bridge output terminal 234. A fixed condenser 242 is connected in parallel with the series combination of compensating condenser 204 and inductance 238.

The inductances 232 and 238 and the fixed condensers 236 and 242 are provided to compensate for the residual capacities of the compensating and measuring condensers to eliminate the effects of changes in the dielectric constant. The values of these components and the theory of their operation will be discussed more fully later.

The bridge unbalance voltage produced at the output terminal 234 is connected by a lead 244 to an input terminal 246 of an amplifier 248, corresponding to amplifier 81 of FIGURE 2. The other input terminal 252 of amplifier 248 is connected to the common ground circuit. This amplifier is energized, for example, by a lead 254 which is connected to the positive terminal 256 of a conventional rectifier-filter type power supply 258, the negative output terminal 260 of which is connected to the common ground circuit. This power supply is energized from alternating current power mains 262 and 264.

The amplified bridge unbalance signals appearing between the amplifier output terminals 266 and 268 are coupled to input terminals 272 and 274 of the motor control circuits, indicated in block form at 276. These motor control circuits may be of the general type described in connection with FIGURE 2, or other known motor control circuits can be employed. Positive voltage can be supplied to the motor control circuits from the power supply 258, as by lead 278, and alternating voltage can be provided from the mains 262 and 264 by leads 282 and 284, or other suitable energizing arrangements can be provided.

The motor control voltage appearing between output terminals 286 and 288 of the motor control circuits is connected to a reversible electric motor, indicated diagrammatically at 292, which may be connected also by leads 294 and 296 to the alternating current supply mains 262 and 264. The motor 292 may be a two-phase motor such as the motor 72 of FIGURE 2 or other suitably controlled reversible driving arrangements can be used. The motor 292 is arranged mechanically to adjust the potentiometer contact 224 in such direction as to maintain the balance condition. An indicator 298, which may be a mechanical counter driven by the motor 292 as indicated, in this embodiment is calibrated to read the volume of the liquid being measured. Density compensating arrangements can be added to this circuit in the manner described in connection with FIGURE 2, so that the indicator 298 could then be calibrated in terms of the weight of the liquid.

In order to explain the operation of this circuit, let $C_o$ be the capacity of the measuring condenser 202 when the tank is empty, that is, with air filling the space between the condenser plates and $C_A$ be the capacity of this condenser under the same conditions, but including the stray capacities due to the connecting leads, etc.; then the capacitance $C_t$ of this condenser with the apparatus in use is:

$$C_t = C_A + (K-1)C_o X \tag{13}$$

where "X" represents the fractional proportion of the measuring condenser that is immersed in the liquid being measured and K is the dielectric constant of the liquid.

$C_A$ and $C_o$ are constants and their ratio can be represented as $$\frac{C_A}{C_o} = \alpha \tag{14}$$

so that $$C_t = C_o[\alpha + (K-1)X] \tag{15}$$

Let the inductance 232 be selected so that $$L_{232} = \frac{1}{\omega^2 C_o \alpha} \tag{16}$$

The series impedance of inductance 232 and the measuring condenser 202 then becomes $$j\omega L_{232} + \frac{1}{j\omega C_t} = j\left[\frac{1}{\omega C_o \alpha} - \frac{1}{\omega C_o[\alpha + X(K-1)]}\right]$$
$$= \frac{j}{\omega C_o} \cdot \frac{(K-1)X}{\alpha[\alpha + X(K-1)]} \tag{17}$$

The impedance $Z_1$ of the parallel combination between the sliding contact 224 of potentiometer 222 and the output terminal 234 then is $$Z_1 = \frac{1}{\frac{\omega C_o}{j} \cdot \frac{\alpha[\alpha + (K-1)X]}{(K-1)X} + j\omega C_{236}}$$
$$= \frac{(K-1)X}{-j\omega C_o \alpha^2 - j\omega C_o \alpha(K-1)X + j\omega C_{236}(K-1)X} \tag{18}$$

where $C_{236}$ is the capacity of the condenser 236. $C_{236}$ is selected to be of the value $$C_{236} = \alpha C_o \tag{19}$$

that is, $C_{236}$ is selected to be equal to the capacity of the measuring condenser 202 when empty plus the stray capacities associated with it. This value of $C_{236}$ when substituted in Equation 18, gives $$Z_1 = \frac{j(K-1)X}{\omega C_o \alpha^2} \tag{20}$$

In the other branch of the bridge circuit, the submerged compensating condenser 204 is assigned the value $$C_{204} = K\delta C_o \tag{21}$$

where K is the dielectric constant of the liquid which is being measured and which completely fills the spaces between the condenser plates.

The inductance 238 is selected to have the value $$L_{238} = \frac{1}{\omega_2 \alpha C_o} \tag{22}$$

and the fixed condenser 242 has a capacity equal to the capacity which the compensating condenser 204 would have if it were free of the liquid so that air filled the spaces between its plates, thus $$C_{242} = \delta C_o \tag{23}$$

The series impedance of the compensating condenser 204 and the inductance 238 then is $$j\omega L_{238} + \frac{1}{j\omega C_{204}} = j\left[\frac{1}{\omega \alpha C_o} - \frac{1}{\omega K \delta C_o}\right] = \frac{j(K-1)}{\omega K \delta C_o} \tag{24}$$

and the impedance of the parallel combination between the end of transformer winding 216b and the bridge output terminals 234 is $$Z_2 = \frac{1}{j\omega\delta C_o + \frac{\omega K \delta C_o}{j(K-1)}} = \frac{j(K-1)}{\delta \omega C_o} \tag{25}$$

The unbalance voltage $e_o$ which is developed between the output terminal 234 and ground is the voltage which would result from transformer winding portion 216a acting alone, less the opposing voltage which would be produced by winding portion 216b acting alone. If we let the voltage produced by winding portion 216a equal "e" and that produced by winding portion 216b equal "−e," and the voltage at the sliding contact 224 of potentiometer 222 equal "me" where m is a proportionality factor depending upon the setting of the potentiometer contact 224, then $$C_o = me = \frac{\frac{j(K-1)}{\delta\omega C_o}}{\frac{j(K-1)}{\delta\omega C_o} + \frac{j(K-1)X}{\omega C_o \alpha^2}} - e\frac{\frac{j(K-1)X}{\omega C_o \alpha^2}}{\frac{j(K-1)}{\delta\omega C_o} + \frac{j(K-1)X}{X^2\omega C_o}}$$

(26)

and $$\frac{e_o}{e} = \frac{m\alpha^2 - X\delta}{\alpha^2 + X\delta}$$

(27)

It is apparent that balance condition is obtained when $$m = \frac{\delta}{\alpha^2} X$$

(28)

so that the unbalance voltage is zero and that the setting of the potentiometer contact 224 which produces this condition is independent of the dielectric constant K of the liquid. If the circuit constants are chosen so that $$\delta = \alpha^2$$

(29)

then balance is obtained when $$m = X$$

(30)

From the above consideration of two embodiments of the invention, it will be apparent that other circuit configurations can be utilized in accordance with the invention in order to best adapt it for particular applications.

From the foregoing it will be observed that the capacitance type measuring system embodying my invention is well adapted to attain the ends and objects hereinbefore set forth and to be economically manufactured since the separate features are well suited to common production methods and are subject to a variety of modifications as may be desirable in adapting the invention to different applications. For example, although the bridge circuit shown herein has certain practical advantages in operation, the invention can be applied to other networks in which it is desired to compensate for residual capacitances in order to eliminate variations caused by change in dielectric constant.

Furthermore, it is apparent that certain features of the invention may be used at times to advantage without a corresponding use of other features, and it is not intended to limit the coverage of the present invention to exclude such modifications or omissions.

What is claimed is:

1. A capacitance-type gauge for measuring the amount of liquid in a container independently of the dielectric constant of the liquid, comprising a source of alternating current, a bridge circuit energized by said alternating current and having first and second arms and output terminals, a measuring condenser and a first inductive element both connected in said first arm so as to pass A.C. current through said arm through both said measuring condenser and said first inductive element, said measuring condenser being immersed in the liquid to be measured to an extent dependent upon the level thereof so that the capacity of said measuring condenser is a function of the level and of the dielectric constant of said liquid, said first inductive element having a reactance value equal in amount to the reactance value of said measuring condenser when free of said liquid; a compensating condenser and a second inductive element both connected in said second arm in the same way that said measuring condenser and said first inductive element are connected in said first arm, so as to pass A.C. current through said second arm through both said compensating condenser and said second inductive element, said compensating condenser being totally immersed in said liquid so that the capacity thereof is a function solely of the dielectric constant of said liquid, said second inductive element having a reactance value at the frequency of operation equal in amount to the reactance value of said compensating condenser when free of said liquid; a first of said output terminals for said bridge circuit being connected to an interconnection between said first and said second arms, said alternating current source being connected across said first and said second arms in series, third and fourth arms also included in said bridge circuit and together being connected in series across said first and said second arms in series, a second of said output terminals for said bridge circuit being connected between said third and said fourth arms, and means for balancing said bridge to produce a null voltage across said output terminals thereof, comprising a means for adjustably varying the resistance of one of said third and said fourth arms, the adjusted value of said resistance being indicative of the amount of liquid in the container to be measured.

2. A capacitance-type gauge in accordance with claim 1, in which said measuring condenser and said first inductive element are connected in parallel with each other in said first arm of said bridge circuit, and in which said compensating condenser and said second inductive element are similarly connected in parallel with each other in said second arm of said bridge circuit.

3. A capacitance-type gauge in accordance with claim 1, in which said measuring condenser and first inductive element are connected in series with each other in said first arm of said bridge circuit, and in which said compensating condenser and said second inductive element are similarly connected in series with each other in said second arm of said bridge circuit.

4. A capacitance-type gauge in accordance with claim 1, in which said measuring condenser and first inductive element are connected in series with each other in said first arm of said bridge circuit, and a first fixed capacitive element is also connected in said first arm in parallel with the series combination of said measuring condenser and said first inductive element, said first fixed capacitive element having a reactance value at the frequency of operation equal to the magnitude of the reactance of said first inductive element; and in which said compensating condenser and said second inductive element are similarly connected in series with each other in said second arm of said bridge circuit, and a second fixed capacitive element is connected in said second arm in parallel with the series combination of said compensating condenser and said second inductive element, said second fixed capacitive element having a reactance value at the frequency of operation equal to the magnitude of the reactance of said second inductive element.

5. A capacitive-type gauge in accordance with claim 1, in which said third and fourth arms comprise the secondary of a transformer, the primary of which is energized by said source of alternating current, said transformer secondary including first and second secondary winding portions comprising respectively said third and fourth arms, in which said means for adjustably varying the resistance of one of the third and fourth arms comprises adjustable attenuation means connected to one of said winding portions to adjust the voltage applied to its bridge arm thereby to vary the condition of balance of said bridge circuit, a voltage-responsive device connected to said output terminals of said bridge circuit, a reversible motor under the control of said voltage-responsive device, and coupling means for mechanically connecting said motor to said attenuation means to rebalance said bridge circuit automatically.

6. A capacitance-type gauge for measuring the amount of liquid in a container independently of the dielectric constant of the liquid comprising a source of alternating current, a bridge circuit energized by said alternating current and having first and second arms and output terminals, said first arm including a measuring condenser having spaced cylindrical plates positioned to extend vertically into said liquid so that the capacity of said measuring condenser is a function of the level and dielectric constant of said liquid, and a first inductive element connected in parallel with said measuring condenser and having a reactance value at the frequency of operation equal to the magnitude of the reactance value of said measuring condenser when free of said liquid, said second arm including a compensating condenser having spaced plates and immersed in said liquid so that its capacitance is a function of the dielectric constant of said liquid, and a second inductive element connected in parallel with said compensating condenser and having a reactance value at the frequency of operation equal to the magnitude of the reactance value of said compensating condenser when free of said liquid, a transformer connected to said alternating current source and having first and second secondary winding portions, circuit means connecting each of said winding portions to one of said bridge arms, resistance type adjustable attenuation means connected to one of said winding portions to adjust the voltage applied to its bridge arm thereby to vary the condition of balance of said bridge circuit, a voltage responsive device connected to said output terminals, a reversible motor under the control of said voltage responsive device, and coupling means connecting said motor to said attenuation means to rebalance said bridge circuit automatically.

7. A capacitance-type gauge for measuring the amount of liquid in a container independently of the dielectric constant of the liquid comprising a source of alternating current, a bridge circuit energized by said alternating current and having first and second arms and output terminals, said first arm including a measuring condenser having spaced cylindrical plates positioned to extend vertically into said liquid so that its capacity is a function of the level and dielectric constant of said liquid, a first inductive element connected in series with said measuring condenser, and a first capacitance element of constant value connected in parallel with the series combination of said measuring condenser and said first inductive element, said first capacitance and inductive elements each having a reactance value at the frequency of operation equal to the magnitude of the reactance value of said measuring condenser when free of said liquid, said second arm including a compensating condenser having spaced plates immersed in said liquid so that its capacitance is a function of the dielectric constant of said liquid, a second inductive element connected in series with said compensating condenser, and a second capacitance element of constant value connected in parallel with the series combination of said compensating condenser and said second inductive element, said second inductive and capacitance elements each having a reactance value at the frequency of operation equal to the magnitude of the reactance value of said compensating condenser when free of said liquid, a transformer connected to said alternating current source and having first and second secondary winding portions, circuit means connecting each of said winding portions to one of said bridge arms, resistance type adjustable attenuation means connected to one of said winding portions to adjust the voltage applied to its bridge arm thereby to vary the condition of balance of said bridge circuit, a voltage responsive device connected to said output terminals, a reversible motor under the control of said voltage responsive device, and coupling means connecting said motor to said attenuation means to rebalance said bridge circuit automatically.

8. Apparatus for accurately indicating the quantity of liquid in a tank, while compensating for variations in the dielectric constant thereof, comprising: a first source of alternating voltage; measuring capacitive means connected to said first source of voltage and located in the tank so as to be immersed in the liquid therein to an extent dependent upon the height of the liquid in the tank, said measuring capacitive means providing a signal of a first phase indicative of the height and the dielectric constant of said liquid; a second source of alternating voltage, which is opposite in phase from said first source; compensator capacitive means connected to said second source of voltage and located so as to be completely immersed in said liquid and providing a signal opposite in phase from the signal from said measuring capacitive means and of a magnitude indicative of the dielectric constant of the liquid in the tank; means for balancing out the empty capacitances of said measuring capacitive means and of said compensator capacitive means, including respectively, reactances arranged to be energized by alternating potentials which are at least similar in magnitude to the potentials supplied to said measuring capacitive means and to said compensator capacitive means respectively, and the potentials supplied to each of said reactive means being such, in conjunction with the reactances of each said reactive means, that the signals supplied from said reactive means respectively will be equal in magnitude to and opposite in phase from the respective signals supplied from said measuring capacitive means and from said compensator capacitive means when there is no liquid therein respectively; and indicating and rebalancing means connected to both said capacitive means and to both said reactive means and responsive to the resultant of the four of said signals, said indicating and rebalancing means being connected to adjust the relative magnitudes of the first source of voltage and the potential supplied to said reactive means which is used to balance out the empty capacitance of said measuring capacitive means on the one hand all with respect to the second source of voltage and the potential supplied to said reactive means which is used to balance out the empty capacitance of said compensator capacitive means on the other hand, all so that the resultant of the four of said signals will be reduced substantially to zero.

9. Apparatus for accurately indicating the quantity of liquid in a tank in accordance with claim 8, in which said measuring capacitive means and the reactance which is arranged to balance out the empty capacitance thereof are both energized by fixed potentials; in which said compensator capacitive means and the reactance which is used to balance out the empty capacitance thereof are both energized by variable potentials; and in which said indicating and rebalancing means are effective to vary the magnitude of the variable potentials applied to said compensator capacitive means and to the reactance used to balance out the empty capacitance thereof.

10. Apparatus for indicating the quantity of liquid in a tank in units of weight, comprising: a measuring capacitor arranged to be immersed in the liquid to be measured to an extent dependent upon the height of said liquid, so that its capacitance is dependent upon the height of the liquid in the tank and the dielectric constant thereof; a first source of alternating voltage, means connecting said measuring capacitor to said first source of voltage to produce a signal of a first phase; a second capacitor; a second source of alternating voltage of a phase opposite that of said first source, means connecting said second capacitor to said second source of alternating voltage to produce a signal of a phase opposite that of the signal produced by said measuring capacitor; density-responsive means including at least one float which is arranged continuously to be submerged in the liquid and which is positioned in accordance with the density of said liquid; means connected to and controlled by said density-responsive means for varying the magnitude of at least one of said sources of alternating voltage to introduce a density factor into the magnitude of at least one of said signals; and means subject to the resultant of said signals for providing an indication of the weight of the liquid in the tank.

11. Apparatus for indicating the quantity of liquid in a tank in units of weight, comprising: a measuring capacitor arranged to be immersed in the liquid to be measured to an extent dependent upon the height of said liquid, so that its capacitance is dependent upon the height of the liquid in the tank and the dielectric constant thereof; a first source of alternating voltage of substantially constant magnitude, means connecting said measuring capacitor to said first source of voltage to produce a signal of a first phase; a second capacitor; a second source of alternating voltage of variable magnitude and of a phase opposite that of said first source, means connecting said second capacitor to said second source of alternating voltage to produce a signal of a phase opposite that of the signal produced by said measuring capacitor; density-responsive means including at least one float which is arranged continuously to be wholly submerged in the liquid and which is positioned in accordance with the density of said liquid; means connected to and controlled by said density-responsive means for varying the magnitude of at least one of said sources of alternating voltage to introduce a density factor into the magnitude of at least one of said signals; indicating and rebalancing means connected to said capacitors, so as to be subject to the resultant of the signals therefrom; and means controlled by said indicating and rebalancing means for varying the magnitude of said second source of voltage, so as to reduce the resultant signal supplied to said indicating and rebalancing means substantially to zero, said indicating and rebalancing means including an indicator for providing an indication of the weight of the liquid in the tank.

12. Apparatus for accurately indicating the quantity of liquid in a tank in units of weight, comprising: a measuring capacitor arranged to be immersed in the liquid to be measured to an extent dependent upon the height of said liquid, so that its capacitance is dependent upon the height of the liquid in the tank and the dielectric constant thereof; a first source of alternating voltage, means connecting said measuring capacitor to said first source of voltage to produce a signal of a first phase; a dielectric compensation capacitor having spaced electrodes and arranged to be positioned so that said liquid at all times fills the space between said spaced electrodes, the capacitance value of said compensation capacitor varying solely with the dielectric constant of said liquid; a second source of alternating voltage of a phase opposite that of said first source, means connecting said compensation capacitor to said second source of alternating voltage to produce a signal of a phase opposite that of the signal produced by said measuring capacitor; density-responsive means positioned so as to be responsive to the density of said liquid, means connected to and controlled by said density-responsive means for varying the magnitude of at least one of said sources of alternating voltage to introduce a density factor into the magnitude of at least one of said signals; and means subject to the resultant of said signals for providing an indication of the weight of the liquid in the tank.

13. Apparatus for accurately indicating the quantity of liquid in a tank in units of weight, comprising: a first source of alternating voltage; measuring capacitive means connected to said first source of voltage and located in the tank and providing a signal indicative of the height and dielectric constant of the liquid therein; a second variable source of voltage, opposite in phase from that of said first source; compensator capacitive means connected to said second variable source of voltage and located so as to be completely immersed in said liquid and providing a signal opposite in phase from the signal from said measuring capacitive means and of a magnitude indicative of the dielectric constant of the liquid in the tank; density-responsive means; means variably connecting said density-responsive means to one of said voltage sources so as to control the relative voltages supplied to said measuring capacitive means and to said compensator capacitive means in accordance with the density of said liquid; and indicating and rebalancing means connected to said two capacitive means and adding the two signals together to provide an indication of weight of the liquid; said indicating and rebalancing means being connected to adjust the magnitude of said second variable source of voltage which is supplied to said compensator capacitive means and changing the signal from said compensator capacitive means upon the resultant signal not being zero, such that the change of signal from said compensator capacitive means becomes equal to the change of signal from said measuring capacitive means due to change in height of the liquid in the tank and reduces the sum of the two signals to zero.

14. Apparatus for accurately indicating the quantity of a liquid in a tank in units of weight in accordance with claim 13, further comprising reactive means arranged to be energized by a potential opposite in phase from the potential of said first voltage source; said reactive means and the magnitude of the potential by which this means is energized being so selected that the signal derived from said reactive means will be equal in magnitude to and opposite in phase from the signal supplied from said measuring capacitive means when there is no liquid in said tank, said signal from said reactive means also being supplied to said indicating and rebalancing means and serving to oppose and balance out that portion of the signal from said measuring capacitive means indicative of no liquid in the tank.

15. Apparatus for accurately indicating the quantity of liquid in a tank in units of weight in accordance with claim 13, further comprising: compensator empty container reactive means arranged to be energized by a potential varying with said second variable source of voltage, and of such a magnitude with respect to the reactance of said empty container reactive means that the signal supplied therefrom, which is supplied to said indicating and rebalancing means, will be opposite in phase from and equal in magnitude to that portion of the signal from said compensator capacitive means indicative of no liquid in the tank.

16. Apparatus for accurately indicating the quantity of liquid in a tank in units of weight in accordance with claim 13, further comprising: means for balancing out the empty capacitances of said measuring capacitive means and of said compensator capacitive means, including respectively, reactances arranged to be energized by alternating potentials which are at least similar in magnitude to the potentials supplied to said measuring capacitive means and to said compensator capacitive means respectively, each of said reactive means being connected to supply its signal to said indicating and rebalancing means, and the potentials supplied to each of said reactive means being such, in conjunction with the reactances of each of said reactive means, that the signals supplied from said reactive means respectively will be equal in magnitude to and opposite in phase from the respective signals supplied from said measuring capacitive means and from said compensator capacitive means when there is no liquid in the tank; and wherein said density-responsive means includes at least one float which is arranged continuously to be submerged in the liquid and which is positioned in accordance with the density of said liquid.

References Cited in the file of this patent

UNITED STATES PATENTS

| Re. 24,075 | de Giers | Oct. 18, 1955 |
| --- | --- | --- |
| 2,188,628 | Freystedt | Jan. 30, 1940 |
| 2,200,863 | Schuck | May 14, 1940 |
| 2,273,850 | Ewald | Feb. 24, 1942 |
| 2,361,173 | Browne | Oct. 24, 1944 |
| 2,377,275 | Smith | May 29, 1945 |
| 2,541,743 | Brockman | Feb. 13, 1951 |
| 2,563,280 | Schafer et al. | Aug. 7, 1951 |
| 2,563,281 | Griffith | Aug. 7, 1951 |

FOREIGN PATENTS

| 441,576 | Great Britain | Jan. 22, 1936 |
| --- | --- | --- |
| 114,980 | Sweden | Sept. 18, 1945 |

UNITED STATES PATENT OFFICE
CERTIFICATE OF CORRECTION

Patent No. 3,112,647                            December 3, 1963

Carl G. Sontheimer

It is hereby certified that error appears in the above numbered patent requiring correction and that the said Letters Patent should read as corrected below.

Column 3, line 19, for "opertaion" read -- operation --; line 42, for "dieelctric" read -- dielectric --; line 71, for "potrion" read -- portion --; column 4, line 4, for "birdge" read -- bridge --; column 5, line 34, for "to", second occurrence, read -- of --; column 16, line 72, insert the following reference:

2,581,085    Edelman -------------- Jan. 1, 1952

Signed and sealed this 21st day of April 1964.

(SEAL)
Attest:

ERNEST W. SWIDER

Attesting Officer

EDWARD J. BRENNER
Commissioner of Patents